(12) United States Patent
Sasaki et al.

(10) Patent No.: US 12,271,095 B2
(45) Date of Patent: Apr. 8, 2025

(54) OPTICAL SCANNER HAVING OPTICAL PHASED ARRAY, AND COMPUTER PROGRAM PRODUCT FOR CONTROLLING OPTICAL PHASED ARRAY

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hikaru Sasaki, Nisshin (JP); Koichi Oyama, Nisshin (JP); Taro Beppu, Kariya (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 630 days.

(21) Appl. No.: 17/687,054

(22) Filed: Mar. 4, 2022

(65) Prior Publication Data

US 2022/0283475 A1    Sep. 8, 2022

(30) Foreign Application Priority Data

Mar. 8, 2021 (JP) .................................. 2021-036405

(51) Int. Cl.
*G02F 1/29* (2006.01)
*G01B 7/16* (2006.01)
*G01S 7/481* (2006.01)

(52) U.S. Cl.
CPC ............... *G02F 1/292* (2013.01); *G01B 7/16* (2013.01); *G01S 7/4817* (2013.01)

(58) Field of Classification Search
CPC ............................... G02F 1/292; G02F 1/2955
See application file for complete search history.

(56) References Cited

U.S. PATENT DOCUMENTS

2019/0260123 A1*    8/2019    Poulton ................ H01Q 3/2676

\* cited by examiner

*Primary Examiner* — Joseph P Martinez
(74) *Attorney, Agent, or Firm* — Posz Law Group, PLC

(57) ABSTRACT

An optical scanner includes a substrate, an optical phased array, a shape sensor, a deviation calculation unit, and a control unit. The optical phased array includes an antenna array having a plurality of antenna elements. The deviation calculation unit calculates an amount of positional deviation of each antenna element based on an amount of deformation of the substrate detected by the shape sensor, and calculates an amount of phase deviation of light emitted from each antenna element. The control unit corrects the phase of light emitted from each antenna element based on the amount of phase deviation calculated by the deviation calculation unit, and controls the phase of the antenna element so that the antenna array emits the light in a target direction.

8 Claims, 6 Drawing Sheets

OPTICAL SCANNER HAVING OPTICAL PHASED ARRAY, AND COMPUTER PROGRAM PRODUCT FOR CONTROLLING OPTICAL PHASED ARRAY

CROSS REFERENCE TO RELATED APPLICATION

The present application claims the benefit of priority from Japanese Patent Application No. 2021-036405 filed on Mar. 8, 2021. The entire disclosures of the above application are incorporated herein by reference.

TECHNICAL FIELD

The present disclosure relates to an optical scanner having an optical phased array, and a computer program product for controlling the optical phased array.

BACKGROUND

As a technology of emitting light beams to scan an object without using a mechanical drive unit such as a motor, an optical scanner is known. The optical scanner has an optical phased array. The optical phased array includes an antenna array having a plurality of antenna elements each emitting light. The phase of light emitted from each antenna element is controlled, so that the optical phased array emits light in a target direction.

The phase of the light emitted from each antenna element is determined according to the position of the antenna element and the wavelength of the light. However, if characteristics of a waveguide from a light source to each antenna element are changed due to a temperature change, variation in elements constituting the waveguide, or the like, an error occurs in the phase of the light emitted from each antenna element. As a result, it may be difficult to emit the light from the antenna array in the target direction.

SUMMARY

The present disclosure describes an optical scanner having an optical phased array, and a computer program product for controlling an optical phased array. According to an aspect of the present disclosure, the optical scanner includes a substrate, an optical phased array, a shape sensor, a deviation calculation unit, and a control unit. The optical phased array includes an antenna array having a plurality of antenna elements. The deviation calculation unit calculates an amount of positional deviation of each antenna element based on an amount of deformation of the substrate detected by the shape sensor. The deviation calculation unit further calculates an amount of deviation of a phase of light emitted from each antenna element based on the amount of positional deviation calculated. The control unit corrects the phase of light emitted from each antenna element based on the amount of phase deviation calculated by the deviation calculation unit, and controls a phase of the antenna element so that the antenna array emits the light in a target direction.

BRIEF DESCRIPTION OF THE DRAWINGS

Objects, features and advantages of the present disclosure will become more apparent from the following detailed description made with reference to the accompanying drawings, in which like parts are designated by like reference numbers and in which.

DETAILED DESCRIPTION

Figure 1:
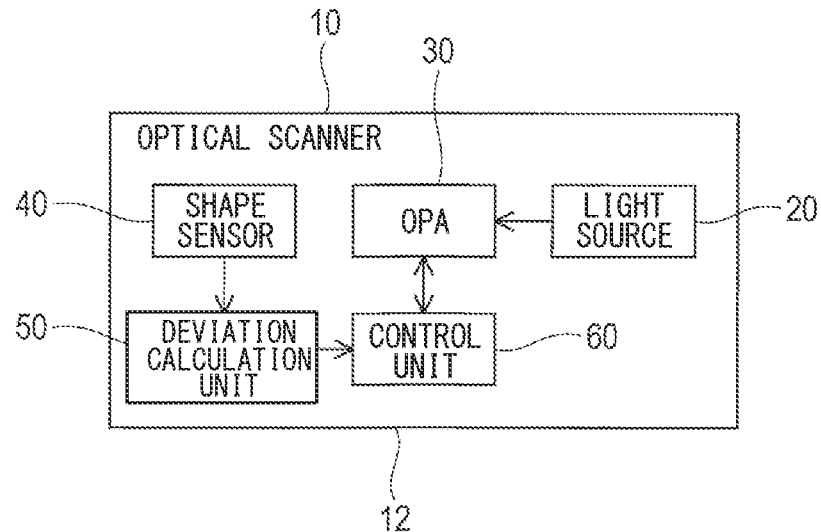
FIG. 1 is a block diagram showing a schematic configuration of an optical scanner according to a first embodiment of the present disclosure.

To begin with, a relevant technology will be described only for understanding the embodiments of the present disclosure.

For example, it is known to detect, by using a detector, a phase of light emitted from each antenna element or a phase of light emitted from the antenna elements and interfered with each other.

In such a technique, it is possible to detect a difference between an actual phase of the light detected by the detector and a target phase. Since the difference between the actual phase and the target phase can be detected, it is possible to correct the phase instructed to the antenna element.

However, as a result of detailed study by the inventors of the present disclosure, it was found that a substrate having an optical phased array thereon is likely to be deformed due to a change in stress caused by an ambient temperature environment and the like. If the substrate is deformed, positions of the antenna elements may be shifted, so the phase of the light emitted from each antenna element may be deviated. If the phase of the light emitted from each antenna element is deviated, it is difficult to emit the light from the antenna array in the target direction.

For example, in a known technique based on the premise that the position of the antenna element is fixed, it was not conceived that the position of the antenna element is deviated due to the deformation of the substrate, and thus the phase of the light emitted from the antenna element is deviated. Therefore, it is not possible to cope with the deviation of the emitting direction of the light due to the deformation of the substrate.

The present disclosure provides a technique of correcting a phase deviation of light caused by a positional deviation of each antenna element.

As described above, according to an aspect of the present disclosure, an optical scanner includes a substrate, an optical phased array, a shape sensor, a deviation calculation unit, and a control unit.

The optical phased array includes an antenna array mounted on a substrate. The antenna array includes a plurality of antenna elements that emits light supplied from a light source. The optical phased array is configured to emit light from the antenna array in a direction according to a phase of the light emitted from each antenna element. The shape sensor is mounted on the substrate and is configured to detect the amount of deformation of the substrate.

The deviation calculation unit is mounted on the substrate. The deviation calculation unit is configured to calculate an amount of positional deviation of each antenna element based on the amount of deformation of the substrate detected by the shape sensor, and calculate an amount of phase deviation of the light emitted from each antenna element based on the amount of positional deviation calculated.

The control unit is mounted on the substrate. The control unit is configured to correct the phase of the light emitted from each antenna element based on the amount of phase deviation calculated by the deviation calculation unit, and control the phase of each antenna element so that the direction of the light emitted from the antenna array coincides with a target direction.

According to an aspect of the present disclosure, a computer program product is for controlling an optical phased array that is mounted on a substrate and having an antenna array including a plurality of antenna elements each emitting light supplied from a light source. The computer program product is stored on a non-transitory computer readable medium, and including instructions configured to, when executed by one or more processors, cause the one or more processors to: calculate an amount of positional deviation of each antenna element based on an amount of deformation detected by a shape sensor mounted on the substrate; calculate an amount of phase deviation of the light emitted from each antenna element based on the amount of positional deviation calculated; correct the phase of the light emitted from each antenna element based on the amount of phase deviation calculated; and control the phase of each antenna element so that a direction of light emitted from the antenna array coincides with a target direction.

In such configurations, even if the position of the antenna element is deviated due to the deformation of the substrate, which is caused by a change in stress due to such as a change in temperature, the correction amount for correcting the phase of the light emitted from the antenna element can be calculated based on the amount of positional deviation of the antenna element calculated based on the amount of deformation of the substrate. As a result, it is possible to emit the light from the antenna array in the target direction.

Embodiments of the present disclosure will be hereinafter described with reference to the drawings.

1. First Embodiment 1-1. Configuration

An optical scanner 10 of the first embodiment shown in FIG. 1 includes a substrate 12, a light source 20, an optical phased array 30, a shape sensor 40, a deviation calculation unit 50, and a control unit 60. Hereinafter, the optical phased array is also referred to as the OPA.

The deviation calculation unit 50 and the control unit 60 solely or in combination include at least one microcomputer having a CPU and a semiconductor memory, such as a ROM or a DRAM, for example. The light source 20, the OPA 30, the shape sensor 40, the deviation calculation unit 50, and the control unit 60 are mounted on the substrate 12.

For example, the optical scanner 10 is mounted on a vehicle. A ranging unit (not shown) detects a distance between the vehicle and an object around the vehicle based on a time difference between the light emitted from the optical scanner 10 and a reflected light of the emitted light. For the substrate 12, for example, a silicon photonics substrate is used.

Figure 2:
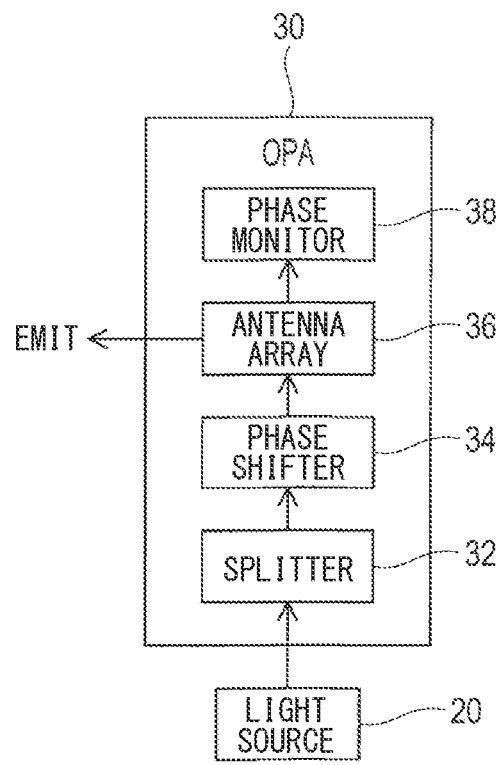
FIG. 2 is a block diagram showing a schematic configuration of an optical phased array of the optical scanner.

The light source 20 is a device that generates laser beam. The OPA 30 is a device that controls an emitting direction of light by utilizing diffraction and interference of light. As shown in FIG. 2, the OPA 30 includes a splitter 32, a phase shifter 34, an antenna array 36, and a phase monitor 38.

The splitter 32 distributes an incident light from the light source 20 to a waveguide array including a plurality of waveguides. The phase shifter 34 is provided in each of the waveguides of the waveguide array. The phase shifter 34 changes a refractive index of the waveguide according to a current value by utilizing an electro-optic effect, a thermo-optical effect, or the like in accordance with an instruction from the control unit 60, so as to change a phase of the light supplied from the waveguide to a corresponding antenna element constituting the antenna array 36.

The antenna array 36 has, for example, hundreds to thousands of antenna elements disposed at regular intervals. One or more antenna elements constitute an antenna group. One or more antenna groups constitute the antenna array 36.

The phase monitor 38 receives a part of the light emitted from each antenna group, and outputs the phase of the emitted light as a voltage value. In a case where the antenna group is made of a plurality of antenna elements, the light emitted from the antenna group is a mixed light in which the light emitted from the plurality of antenna elements is mixed.

Figure 3A:
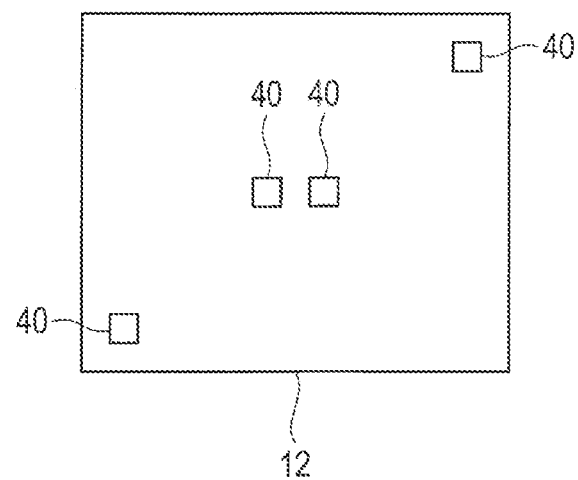
FIG. 3A is a schematic diagram showing the position of shape sensors mounted on a substrate of the optical scanner.
Figure 3B:
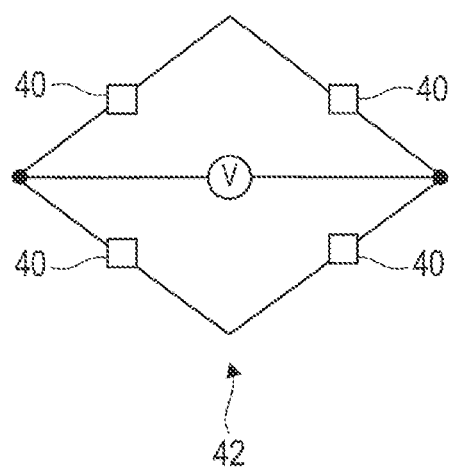
FIG. 3B is a schematic diagram showing a bridge circuit provided by the shape sensors.

The shape sensor 40 includes a strain gauge, a piezo resistance element, or the like. As shown in FIG. 3A, two shape sensors 40 are arranged at a central portion of the substrate 12 and two shape sensors 40 are arranged at peripheral portions on a diagonal line of the substrate 12. Namely, four shape sensors 40 in total are mounted on the substrate 12. The four shape sensors 40 form a bridge circuit 42, as shown in FIG. 3B. The bridge circuit 42 outputs a voltage corresponding to the amount of deformation of the substrate 12.

The deviation calculation unit 50 calculates the amount of deformation of the substrate 12 based on the voltage value output from the bridge circuit 42 provided by the shape sensors 40. Further, the deviation calculation unit 50 calculates the amount of three-dimensional, positional deviation of the antenna element based on the amount of deformation calculated.

Moreover, the deviation calculation unit 50 calculates the amount of deviation of a phase of the light emitted from the antenna group to which the antenna element belongs in a state where the substrate 12 is deformed, relative to the phase of light emitted in a state where the substrate 12 is not deformed, based on the amount of positional deviation of the antenna element.

The control unit 60 stores a map of a target direction of the light emitted from the antenna array 36 and a target phase of the light emitted from the antenna group in order to realize the target direction. Further, the control unit 60 stores a map of the phase of the light emitted from the antenna group and the current value to be output to the phase shifter 34 for the antenna element belonging to the antenna group, in order to emit the light of the target phase from the antenna group.

Figure 4:
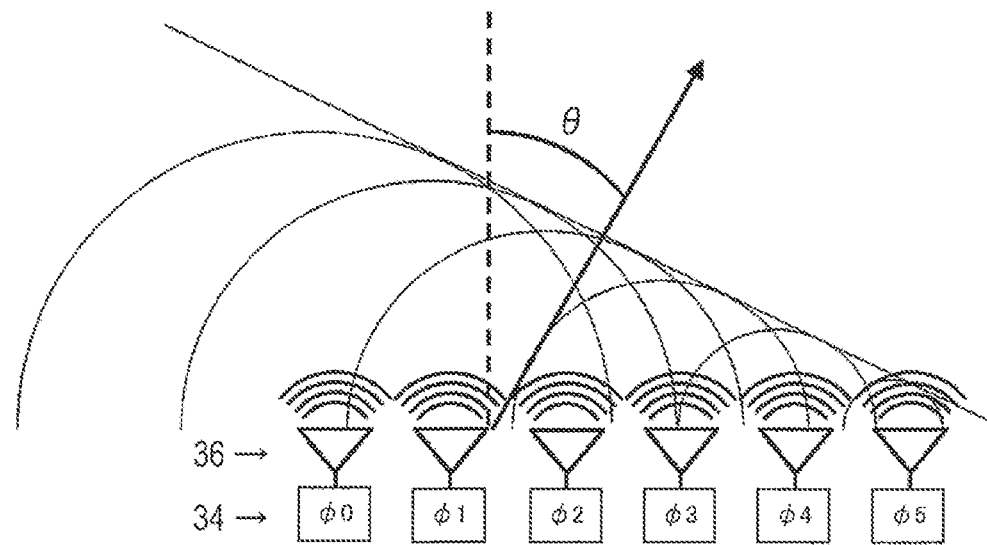
FIG. 4 is a schematic diagram showing a phase of light provided to each antenna element and an emitting direction of light from an antenna array of the optical phased array.

As shown in FIG. 4, the phase shifter 34 controls the phase $\varphi k$ of each antenna element of the antenna array 36 according to the instruction from the control unit 60, so that the emitting direction θ of the light emitted from the antenna array 36 is determined. In FIG. 4, for simplification of the figure, only the six antenna elements represented by k=0 . . . 5 are shown.

Here, the phase of the light emitted from the antenna element is determined by the wavelength of the light used and the position of the antenna element. However, if the characteristics of the waveguide from the light source 20 to each antenna element change due to a temperature change, variation in elements forming the waveguide, or the like, an error occurs in the phase of the light emitted from the antenna element. As a result, an error occurs in the phase of the light emitted from the antenna group, so that the light cannot be emitted from the antenna array 36 in the target direction.

To address such an issue, the control unit 60 receives from the phase monitor 38 the actual phase of the light emitted from the antenna group, and corrects the current value to be output to the phase shifter 34 based on the difference between the actual phase and the target phase.

Figure 5:
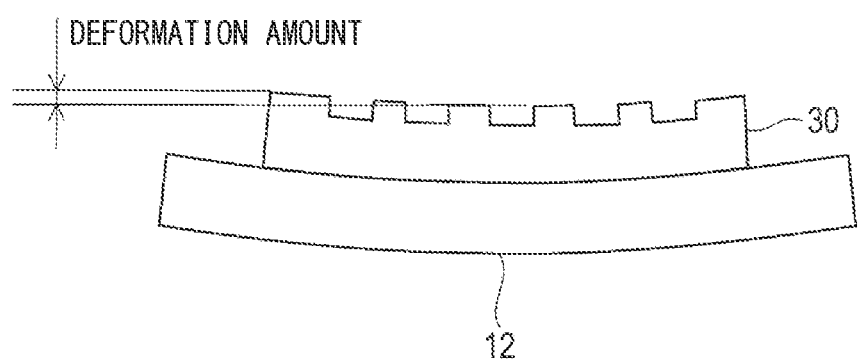
FIG. 5 is a schematic view showing a deformation amount of a substrate.

Further, as shown in FIG. 5, if the substrate 12 is deformed due to a change in stress caused by a temperature change or the like, the position of the antenna element is changed. With this, the phase of the light emitted from the antenna element is deviated from the phase that is instructed by the control unit 60 to realize the target phase of the antenna group. As a result, the light is not emitted from the antenna array 36 in the target direction.

In order to deal with the deviation of the phase caused by the deformation of the substrate 12, the control unit 60 stores a map indicating the relationship between the deformation amount of the substrate 12 and the amount of the three-dimensional positional deviation of the antenna element. Further, the control unit 60 stores a map indicating the relationship between the amount of the three-dimensional positional deviation of the antenna element and the amount of phase deviation of the light emitted from the antenna group to which the antenna element belongs.

Further, the control unit 60 stores a map indicating the relationship between the deviation amount of the phase of the light emitted from the antenna group and the correction amount of the current value output from the phase shifter 34 to the antenna element in order to emit the light from the antenna array 36 in the target direction.

The control unit 60 corrects the current value to be output to the phase shifter 34 by the correction amount of the current value, with the correction amount of the current value corresponding to the deviation amount of the phase as the correction amount of the phase of the light emitted from the antenna element. As a result, the control unit 60 corrects the phase deviation of the light caused by the deformation of the substrate 12.

Further, the control unit 60 sets the target phase of the antenna group to which the antenna element whose phase is corrected by the corrected current value belongs, based on the amount of phase deviation of the antenna group. Then, the control unit 60 corrects the current value to be output to the antenna element based on the difference between the target phase of the antenna group and the actual phase of the antenna group detected by the phase monitor 38, and corrects the phase of the antenna group.

1-2. Processing

Figure 6:
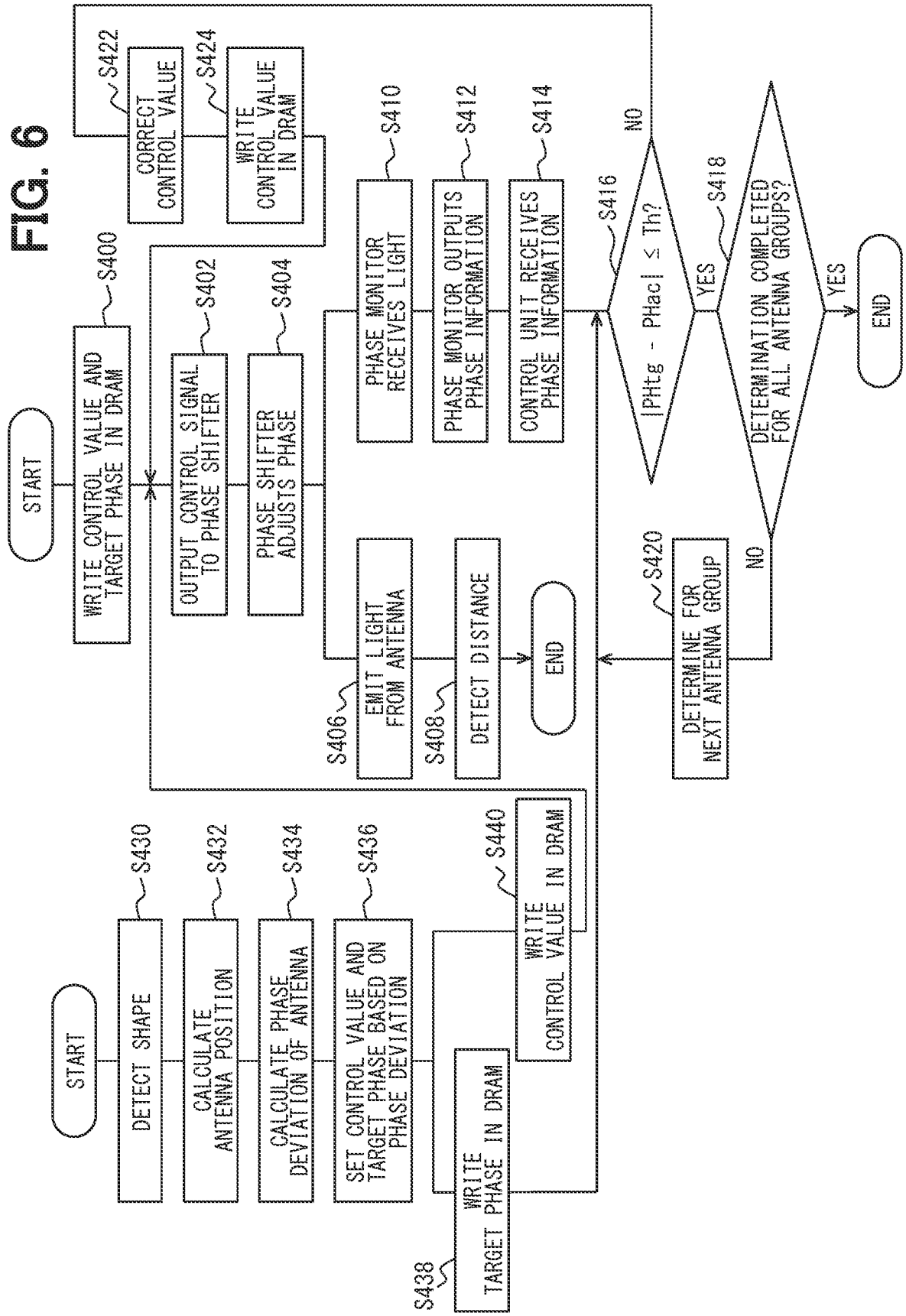
FIG. 6 is a flowchart showing a phase correction processing based on temperature and deformation.

Next, a phase correction processing for the emission light will be described based on the flowchart of FIG. 6. For example, the flowchart of FIG. 6 is executed at predetermined time intervals.

In S400, the control unit 60 reads from the map stored in a non-volatile memory such as a ROM and writes in a DRAM the current value to be provided from each phase shifter 34 to corresponding antenna element as the control value for emitting the light from the antenna array 36 in the target emitting direction.

In S400, the control unit 60 further reads from a map or the like stored in a non-volatile memory and writes in the DRAM the target phase of the light to be emitted from the antenna group, which is provided by one or more antenna elements as a group. The target phase written in S400 is a value in the case where the substrate 12 is not deformed.

In S402, the control unit 60 outputs a control signal corresponding to the control value written in the DRAM to the phase shifter 34. In S404, the phase shifter 34 controls the phase of the light to be emitted from the antenna element based on the control signal output from the control unit 60, so that the phase of the light emitted from the antenna group is controlled.

In S406, the antenna array 36 emits the light in a direction that is determined by the phase of the light emitted from the antenna group.

In S408, the ranging unit (not shown) detects the distance between the vehicle and the object around the vehicle based on the time difference between the light emitted from the optical scanner 10 and the reflected light of the emitted light.

In S410 and S412, the phase monitor 38 receives a part of the light emitted from each antenna group and outputs a voltage value as phase information indicating the phase of the light.

In S414, the control unit 60 receives the phase information of the light emitted from the antenna group from the phase monitor 38. In the case where the antenna group is provided by a plurality of antenna elements, the control unit 60 receives the phase information of the mixed light of the plurality of antenna elements from the phase monitor 38.

In S416, the control unit 60 determines whether or not the difference between the target phase (PHtg) of the antenna group and the actual phase (PHac) received from the phase monitor 38 is equal to or less than a predetermined value (Th). When the determination in S416 is not established (S416: No), that is, when the difference between the target phase (PHtg) and the actual phase (PHac) is larger than the predetermined value (Th), the control unit 60 shifts the processing to S422.

When the determination in S416 is established (S416: Yes), that is, the difference between the target phase (PHtg) and the actual phase (PHac) is equal to or less than the predetermined value (Th), the control unit 60 determines in S418 whether or not the determination of S416 is completed for all the antenna groups. When the determination of S416 is established (S416: Yes), that is, when the determination of S416 is completed for all the antenna groups, the control unit 60 ends the processing.

When the determination of S416 is not established (S416: No), that is, there is an antenna group for which the determination of S416 has not been completed, the control unit 60 shifts the processing from S420 to S416 in order to execute the determination for the next antenna group.

In S422, the control unit 60 corrects the control value of the phase based on the difference between the target phase and the actual phase. In S424, the control unit 60 writes the control value corrected in S422 to the DRAM, and returns the processing to S402. That is, the control value for controlling the phase is feedback-controlled based on the difference between the target phase and the actual phase.

Next, the processing of S430 to S440 will be described. The processing of S430 to S440 is executed in parallel with the processing of S400 to S422 described above.

In S430, the shape sensor 40 detects the amount of deformation of the substrate 12. In S432, the deviation calculation unit 50 acquires the amount of deformation of the substrate 12 detected by the shape sensor 40 in S430, and calculates the position of the antenna element. Further, in S434, the deviation calculation unit 50 calculates the amount of phase deviation of the light emitted the antenna group, based on the special positional difference between the position of the antenna element calculated in S432 and the position of the antenna element of the case where the substrate 12 is not deformed.

The amount of phase deviation of the emitted light is calculated for the light emitted from each antenna element or the mixed light emitted from the plurality of antenna elements, as the antenna group.

In S436, the control unit 60 corrects and sets the current value to be output to the phase shifter 34 as the control value, based on the amount of phase deviation calculated by the deviation calculation unit 50 in S434. The control unit 60 acquires the correction amount of the current value from a map or the like indicating the relationship between the amount of phase deviation and the correction amount of the current value. As a result, the phase of the antenna element to be controlled by the phase shifter 34 is corrected.

Further, in S436, the control unit 60 sets the target phase of the antenna group to which the antenna element whose phase is corrected by the corrected current value belongs, based on the amount of phase deviation of the antenna group. The control unit 60 acquires the target phase from a map or the like indicating the relationship between the deviation amount of the phase and the target phase.

In S438, the control unit 60 writes the target phase set in S436 into the DRAM, and shifts the processing to S416. In S440, the control unit 60 writes the control value of the phase set in S436 into the DRAM, and shifts the processing to S402. Thus, the target phase and the control value written in the DRAM in S400 are rewritten by the target phase and control value written in the DRAM in S438 and S440.

Therefore, the determination of S416 is executed by the target phase written in S438 and the actual phase of the light emitted from the antenna group controlled based on the control value written in S440.

In the first embodiment, S430 to S434 correspond to the processing by the deviation calculation unit 50. Further, S400, S402, S414 to S424, and S436 to S440 correspond to the processing by the control unit 60.

1-3. Effects

The first embodiment described above achieves the following effects.

(1a) Even if the substrate 12 is deformed and the position of the antenna element is deviated, the phase of the light emitted from the antenna element is corrected based on the amount of deformation of the substrate 12 detected by the shape sensors 40. As such, the light can be emitted from the antenna array 36 in the target direction.

(1b) The characteristics of the waveguide from the light source 20 to each antenna element is likely to be changed due to a change in temperature, variations in the elements constituting the waveguide, and the like, and an error is likely to occur in the phase of the light emitted from each antenna element.

However, in the present embodiment, the phase monitor 38 detects the actual phase of the light emitted from the antenna group. As such, the phase of each antenna element can be corrected based on the difference between the target phase and the actual phase. As a result, the antenna array 36 can emit the light in the target direction.

2. Second Embodiment

2-1. Difference from the First Embodiment

Since the basic configurations of a second embodiment are similar to those of the first embodiment, differences will be mainly described hereinafter. Note that the same reference numerals as those in the first embodiment indicate the same configurations, and refer to the preceding descriptions.

Figure 7:
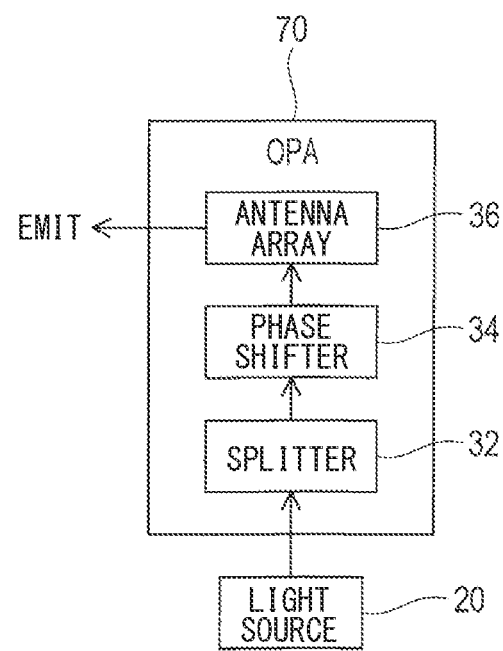
FIG. 7 is a block diagram showing a schematic configuration of an optical phased array of an optical sensor according to a second embodiment of the present disclosure.

In the first embodiment described above, the phase monitor 38 monitors the phase of the light emitted from the antenna element. In the second embodiment, on the other hand, an OPA 70 does not include the phase monitor 38, as shown in FIG. 7. Namely, the second embodiment is different from the first embodiment as the OPA 70 does not monitor the phase of the light emitted from the antenna element.

2-2. Processing

Figure 8:
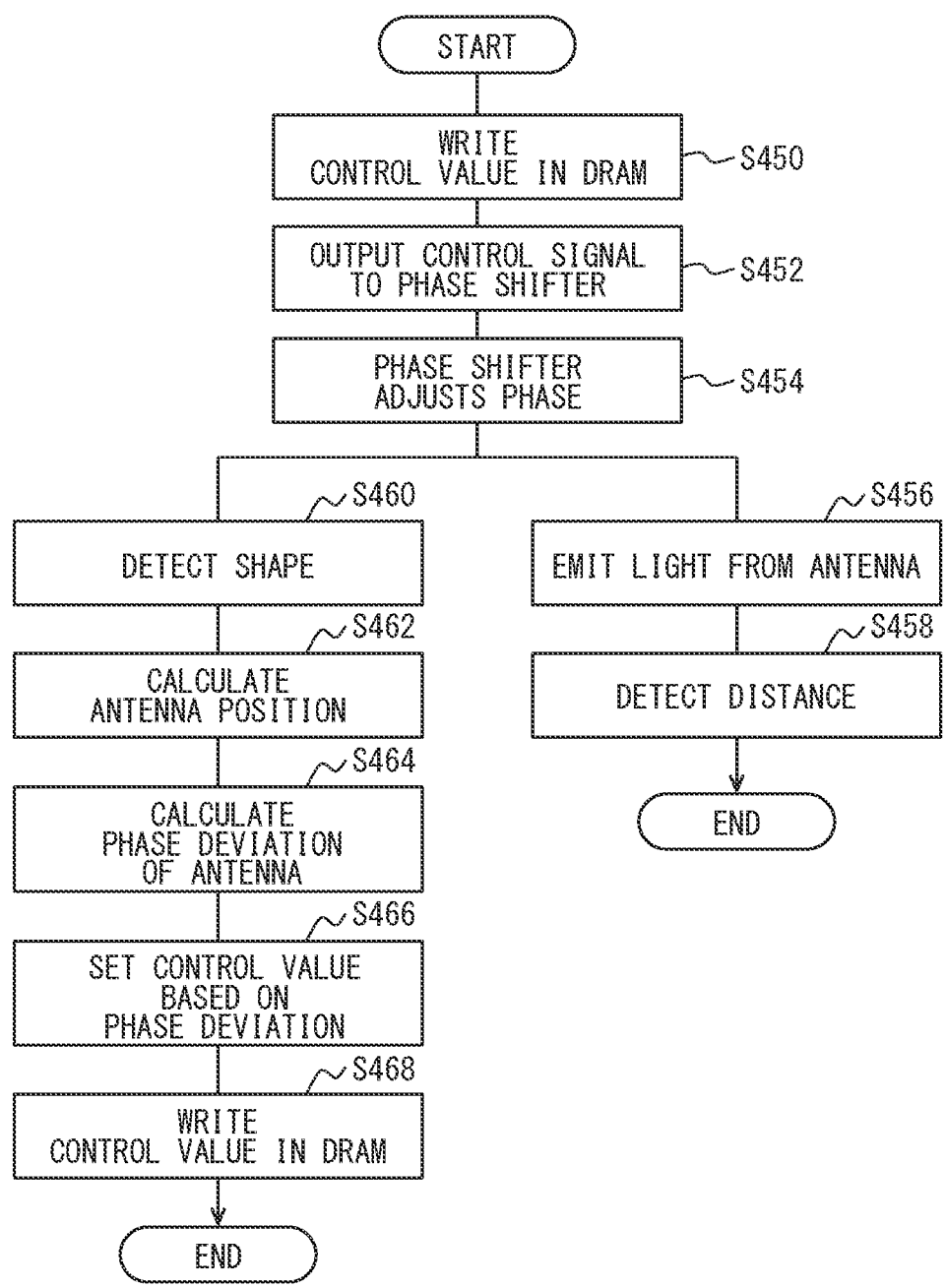
FIG. 8 is a flowchart showing a phase correction processing based on deformation.

Next, a phase correction processing of the second embodiment will be described with reference to a flowchart shown in FIG. 8. The phase correction processing shown in FIG. 8 is executed by an optical scanner of the second embodiment, in place of the phase correction processing of the first embodiment shown in FIG. 6. For example, the flowchart of FIG. 8 is executed at predetermined time intervals.

Since the processing of S452 to S464 in FIG. 8 are the same as the processing of S402 to S408 and the processing of S430 to S434 in FIG. 6 of the first embodiment, and thus the descriptions thereof will be partially simplified.

In S450, the control unit 60 reads from the map or the like stored in the non-volatile memory such as a ROM, and writes in the DRAM the current value to be provided from the phase shifter 34 to each antenna element as the control value in order to emit the light from the antenna array 36 in the target direction.

In S466, the control unit 60 corrects and sets the current value to be provided to the phase shifter 34 as the control value, based on the amount of phase deviation calculated by the deviation calculation unit 50 in S464. The control unit 60 acquires the correction amount of the current value from a map or the like indicating the relationship between the deviation amount of the phase and the correction amount of the current value. As a result, the phase of the antenna element controlled by the phase shifter 34 is corrected.

In S468, the control unit 60 writes the control value of the phase corrected in S466 to the DRAM and ends the processing.

In the second embodiment, S460 to S464 correspond to the processing of the deviation calculation unit 50, and S450, S452, S466, and S468 correspond to the processing of the control unit 60.

2-3. Effects

According to the second embodiment described above, the same effect as the effect (1a) of the first embodiment described above can be achieved.

3. Other Embodiments

While the embodiments of the present disclosure has been described hereinabove, the present disclosure is not limited to the embodiments described above and can be modified in various other ways, for example, as exemplified below.

(3a) In the first embodiment described above, the process of correcting and setting the control value for controlling the phase of the antenna element based on the amount of phase deviation may be omitted in S436 of FIG. 6, and further the process of S440 may be omitted.

As a result, in the determination of S416, the feedback control of the control value is performed based on the difference between the target phase and the actual phase of the antenna group that is controlled by the control value set in the case where there is no phase deviation due to the positional deviation of the antenna element.

(3b) In the second embodiment described above, the phase monitor 38 is not provided, and the feedback control of the control value based on the difference between the target phase and the actual phase is not executed.

On the other hand, in the second embodiment, the phase monitor 38 may be provided. In such a case, the control value may be corrected based on the amount of phase deviation calculated based on the amount of deformation of the substrate 12, and the feedback control of the control value may be executed based on the difference between the actual phase and the target phase relative to the corrected control value.

(3c) In the embodiments described above, the four shape sensors 40 in total are mounted on the substrate 12 so that two of which are arranged at the central portion of the substrate 12 and the other two are arranged on diagonal peripheral edges of the substrate 12 so as to detect the amount of deformation of the substrate 12. On the other hand, the substrate 12 may have at least one shape sensor 40 at the central portion of the substrate 12, and at least one shape sensor 40 at a peripheral edge.

The deviation calculation unit 50 and the control unit 60 and the methods thereof described in the present disclosure may be realized by a dedicated computer provided by configuring a processor and a memory programmed to execute one or multiple functions embodied by a computer program. Alternatively, the deviation calculation unit 50 and the control unit 60 and the method thereof described in the present disclosure may be achieved by a dedicated computer provided by constituting a processor with one or more dedicated hardware logic circuits. Alternatively, the deviation calculation unit 50 and the control unit 60 and the methods thereof described in the present disclosure may be realized by one or more dedicated computers configured by a combination of a processor and a memory programmed to execute one or multiple functions, and a processor configured by one or more hardware logic circuits. Further, the computer program may be stored in a computer-readable non-transitory tangible storage medium as instructions to be executed by a computer. The technique for realizing the functions of each part included in the deviation calculation unit 50 and the control unit 60 do not necessarily need to include software, and all the functions may be realized using one or a plurality of hardware circuits.

(3e) The multiple functions of one component in the above embodiments may be implemented by multiple components, or a function of one component may be implemented by multiple components. Further, multiple functions of multiple components may be implemented by one component, or one function implemented by multiple components may be implemented by one component. A part of the configurations of the embodiments described above may be omitted. At least a part of the configurations of the embodiment described above may be added to or replaced with the configuration of another embodiment described above.

(3f) In addition to the optical scanner and the optical program described above, the present disclosure may be implemented in various forms such as in a system including the optical scanner as a component, a non-transitory tangible storage medium including a semiconductor memory storing the optical program, a computer program product and an optical scanning method.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. An optical scanner comprising:
   a substrate;
   an optical phased array including an antenna array mounted on the substrate, the antenna array having a plurality of antenna elements each emitting light supplied from a light source, the optical phased array being configured to emit light from the antenna array in a direction corresponding to a phase of the light emitted from each antenna element;
   a shape sensor being mounted on the substrate and configured to detect an amount of deformation of the substrate;
   a deviation calculation unit being mounted on the substrate, and configured to calculate an amount of positional deviation of each antenna element based on the amount of deformation of the substrate detected by the shape sensor, and calculate an amount of phase deviation of the light emitted from each antenna element based on the amount of positional deviation calculated; and
   a control unit being mounted on the substrate, and configured to correct the phase of the light emitted from each antenna element based on the amount of phase deviation calculated by the deviation calculation unit, and control the phase of each antenna element so that the direction of the light emitted from the antenna array coincides with a target direction.

2. The optical scanner according to claim 1, wherein
   the shape sensor includes a plurality of shape sensors, and
   among the plurality of shape sensors, at least one shape sensor is mounted at a central area of the substrate, and at least another one shape sensor is mounted at a peripheral area of the substrate.

3. The optical scanner according to claim 2, wherein
   among the plurality of shape sensors, two shape sensors are mounted at the central area of the substrate, and other two shape sensors are mounted at the peripheral area of the substrate, and
   the two shape sensors at the central area and the two shape sensors at the peripheral area form a bridge circuit.

4. The optical scanner according to claim 1, further comprising:
a phase monitor configured to detect an actual phase of the light emitted from the antenna element, wherein
the control unit is configured to set a target phase based on the amount of phase deviation, and correct the phase of the light emitted from the antenna element based on a difference between the actual phase detected by the phase monitor and the target phase.

5. The optical scanner according to claim 4, wherein
the control unit is configured to correct the phase of the light emitted from each antenna element based on the amount of phase deviation, and to correct the phase of the light emitted from each antenna element based on a difference between the corrected actual phase of the antenna element and the target phase.

6. A computer program product for controlling an optical phased array mounted on a substrate, the optical phased array having an antenna array including a plurality of antenna elements each emitting light supplied from a light source, the computer program product being stored on a non-transitory computer readable medium, and comprising instructions configured to, when executed by one or more processors, cause the one or more processors to:
calculate an amount of positional deviation of each antenna element based on an amount of deformation of the substrate detected by a shape sensor mounted on the substrate;
calculate an amount of phase deviation of the light emitted from each antenna element based on the amount of positional deviation calculated;
correct the phase of the light emitted from each antenna element based on the amount of phase deviation calculated; and
control the phase of each antenna element so that a direction of light emitted from the antenna array coincides with a target direction.

7. The computer program product according to claim 6, wherein
the optical phased array includes a phase monitor that is configured to detect an actual phase of the light emitted from each antenna element, and
the instructions are configured to further cause the one or more processors to set a target phase based on the amount of phase deviation, and to correct the phase of light emitted from each antenna element based on a difference between the actual phase detected by the phase monitor and the target phase.

8. An optical scanner comprising:
a substrate;
an optical phased array including an antenna array mounted on the substrate, the antenna array having a plurality of antenna elements each emitting light supplied from a light source, the optical phased array being configured to emit light from the antenna array in a direction corresponding to a phase of the light emitted from each antenna element;
a shape sensor being mounted on the substrate and configured to detect an amount of deformation of the substrate; and
a processor and a memory configured to:
calculate an amount of positional deviation of each antenna element based on the amount of deformation of the substrate detected by the shape sensor;
calculate an amount of phase deviation of the light emitted from each antenna element based on the amount of positional deviation calculated;
correct the phase of the light emitted from each antenna element based on the amount of phase deviation calculated; and
control the phase of each antenna element so that the direction of the light emitted from the antenna array coincides with a target direction.

* * * * *